Figure 5:
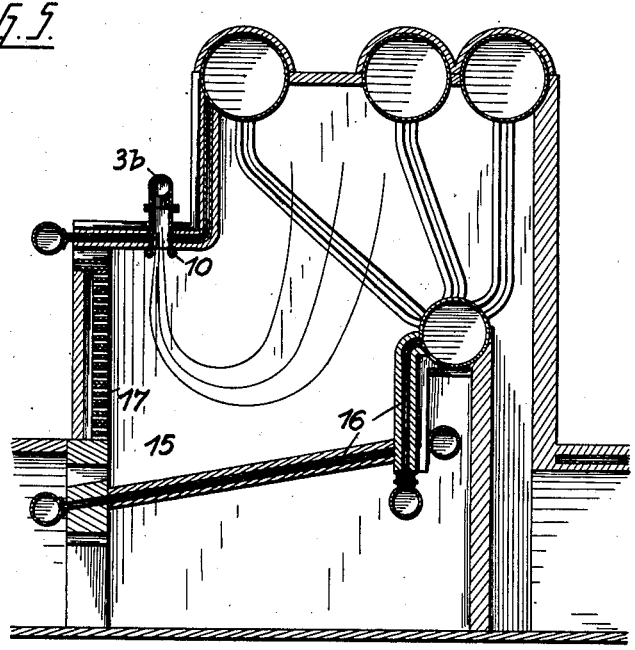

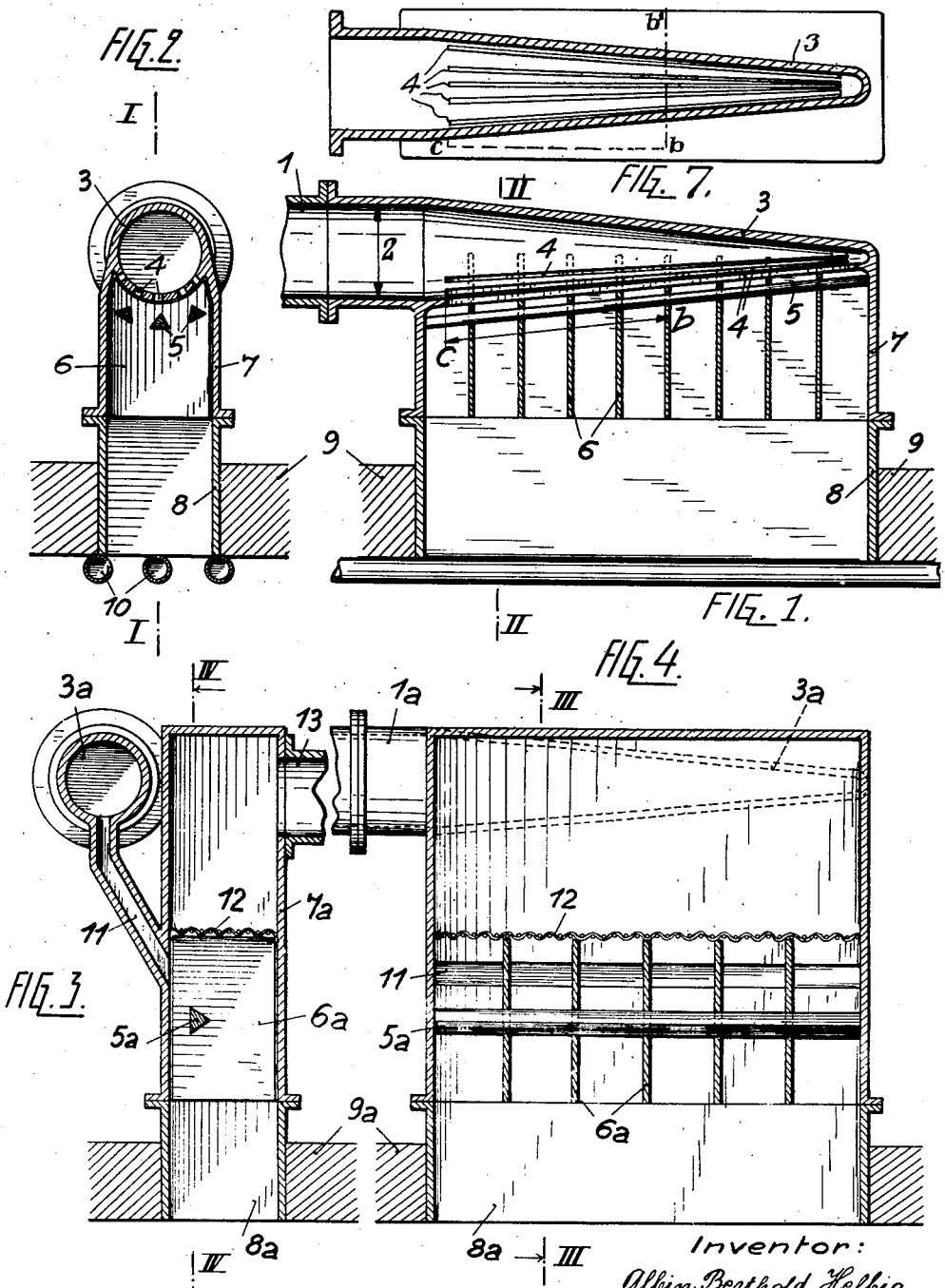

Feb. 25, 1930.  A. B. HELBIG  1,748,173
PULVERULENT FUEL FIRING SYSTEM
Filed Oct. 16, 1925   2 Sheets-Sheet 2

Inventor:
Albin Berthold Helbig
by
Atty.

Patented Feb. 25, 1930

1,748,173

UNITED STATES PATENT OFFICE

ALBIN BERTHOLD HELBIG, OF BERLIN, GERMANY

PULVERULENT-FUEL-FIRING SYSTEM

Application filed October 16, 1925. Serial No. 62,784, and in Germany June 25, 1925.

My invention refers to the production of high temperatures by means of finely subdivided and more especially pulverulent fuel. It is an object of my invention to provide means whereby the economy and output of furnaces heated with finely subdivided fuel is increased as compared with similar furnaces hitherto in use. It is a further object of my invention to reduce the initial cost of such furnaces by reducing their dimensions.

These and other objects are attained primarily by distributing the mixture of finely subdivided fuel and air in such manner as to form it into a thin veil extending substantially across the entire width of the chamber of combustion of the furnace, this mixture being introduced into this chamber at a velocity which is only a little in excess of the velocity of ignition of the mixture, no matter how great is the percentage of primary air in the mixture.

By the term "velocity of ignition" is understood the velocity at which the flame travels in the mixture of air and finely distributed fuel, for instance pulverulent coal containing a predetermined percentage of fuel having a predetermined particle size and a predetermined contents of volatile matter and traveling at a predetermined velocity. The time required for ignition is known to vary in proportion to the percentage of fuel in the mixture, to the particle size and to the contents of volatile matter.

By forming the stream of fuel and air into a thin veil extending across the entire width of the combustion chamber, I impart to the mixture the largest possible surface. I thereby provide that the secondary air can enter the mixture in the shortest possible way by imparting to the flowing mixture a low velocity, and by providing means for a rapid introduction of the secondary air of combustion I succeed in reducing the length of the flame to 8—9 feet, at the same time also reducing the time of combustion. By reducing the distance required for a complete combustion of the fuel contained in the mixture I further reduce the length of the combustion chamber, whereby the initial costs of such combustion chambers are materially lowered.

By introducing the mixture into the chamber of combustion at a velocity which is a little in excess of the velocity of ignition of the mixture I succeed in avoiding ignition of the mixture in direct contact with the nozzle and I succeed in keeping the base portion of the flame away from the nozzle.

Before entering into a detailed description of some of the means adapted for carrying out my invention, I will describe them in a more general way.

Assuming pulverulent coal to be available, this coal is mixed, as usual, with some of the air required for combustion and this mixture is introduced into the combustion chamber of the furnace through a tube or other conduit. At the point where this conduit opens into the nozzle opening into the combustion chamber I prefer arranging the particular kind of a distributing nozzle. Experience has shown that cylindrical distributing nozzles do not work satisfactorily inasmuch as a cylindrical body of air and fuel has a particularly small surface and offers the least possibilities of admixing the secondary air. It has therefore been suggested to extend the nozzle so as to form a long narrow slit extending substantially in parallel with the side walls of the combustion chamber. Obviously the distribution of the fuel in a narrow stream as formed in a nozzle of this kind must be non-uniform inasmuch as the slit in such a device is directed at right angles to the streamlines of the current of air and fuel, whereby the outer parts of the body of air and fuel suffer a change of direction whereby the central part will be charged with a greater quantity of fuel than the outer portions. It has been tried to obviate this drawback by providing suitable guide vanes, but the results have still not been satisfactory.

I succeed in obviating these drawbacks by arranging the slit or slits, through which the mixture of air and fuel escapes from the tapering part of the distributing nozzle into the shaft, substantially in parallel to the streamlines of the mixture and by employing a conical end piece tapering towards the farther end, the slits being formed in this conical or tapering portion. The slits are so arranged in the wall of the tapering end piece that the sum total of the cross-sectional area of the end piece at any point of its length and of the slits from their origin down to this point is always equal to the largest cross-sectional area of the end piece, as will be explained more specifically with reference to the drawings. Owing to this arrangement I succeed in causing substantially equal volumes of the mixture of air and fuel to escape from the distributing nozzle all over its length and in consequence thereof the distribution of fuel in the mixture will also be uniform all over the length of the distributing device. I prevent the fuel from separating out in several streams escaping from the distributing device by providing guide walls extending at right angles to the slits, and I further employ a supply conduit having a far smaller cross-sectional area than the distributing device itself. As is well known, the air carrying the finely subdivided fuel, in order to uniformly convey it in the supply conduit, must travel at a predetermined velocity, which is obtained nowadays with a pressure of 6 to 16 in. of water. If the mixture of air and fuel were blown into the combustion chamber with the velocity resulting from such pressure, a very long flame would result. By increasing the cross-sectional area of the distributing device as compared with the supply conduit I correspondingly reduce the velocity of the mixture. I further provide baffles serving for effecting a still more intimate mixture of the fuel and air escaping from the distributing device. By thus proceeding I am enabled to greatly increase the percentage of primary air entering the combustion chamber. However as 10 to 20 per cent of the air required for combustion are required for conveying the fuel at a pressure of 6 to 16 in., and as on the other hand the secondary air in a system according to this invention only requires a pressure of ⅜ to 1 in. at a maximum, I further reduce the power needed for the introduction of the air by introducing the greater part of the primary air with a low velocity and pressure into the shaft, in which it flows in a large, slowly descending stream to which the fuel with its amount of conveying air is admixed in lateral direction, suitable baffles being disposed so as to intimately mix the two currents.

In order further to protect the inner end of the shaft against the destructive effects of the high temperature in the combustion chamber, I prefer providing means for water-cooling the shaft.

In the drawings affixed to this specification and forming part thereof two modifications of a device embodying my invention and a furnace showing the arrangement of such device are illustrated diagrammatically by way of example.

Figure 6:
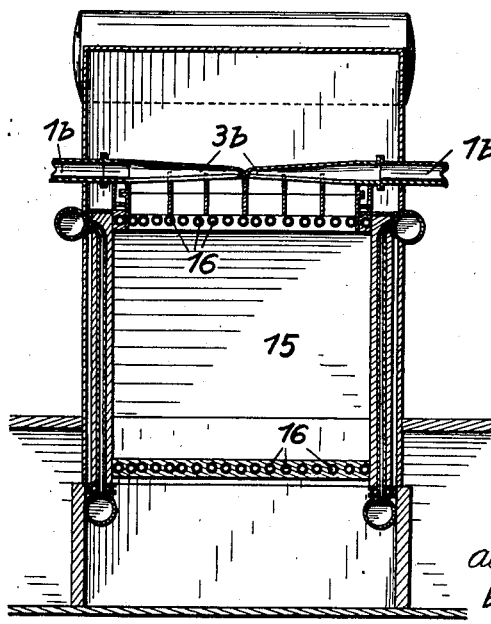

In the drawings
Fig. 1 is an axial section, and
Fig. 2 is a cross-section on the line II—II in Fig. 1,
Fig. 3 is a cross-section, and
Fig. 4 an axial section of a modified form,
Fig. 5 is a longitudinal section, and
Fig. 6 is a cross-section on the line VI—VI in Fig. 5 of a furnace provided with two distributing nozzles similar to those shown in Figs. 1 and 2.
Fig. 7 is a horizontal axial section of the distributing nozzle 3 shown in Figs. 1 and 2.

Referring first to Figs. 1 and 2, 1 is the supply pipe or conduit, through which the mixture of air and fuel is introduced, and 2 is a cylindrical extension connected with the conduit 1. 3 is the conical or tapering distributing nozzle adjoining the cylindrical part 2, and 4, 4 are slits formed in the bottom of the conical extension 3 and extending substantially in axial direction, which is also the direction of flow of the mixture, down to the farther end of the distributing nozzle. 5, 5 are baffles extending below and in parallel with the slits 4, these baffles in the form shown in the drawings having triangular cross-section. 6, 6 are guide walls or partitions extending vertically downwards from the bottom portion of the device 3, these guide walls being for instance formed of sheet metal and subdividing the shaft underneath the slits 4 into a plurality of conduits extending substantially at right angles to the slits. The part 7 of the shaft through which these walls extend and also the part 8 mounted in the top wall 9 of the combustion chamber have a rectangular cross-section of materially greater area than the supply conduit 1, 2. Cooling tubes 10 are disposed below the inner end of the shaft, these tubes in the modification illustrated in the drawings extending in the axial direction of the shaft. I may however also arrange them at right angles thereto. These tubes subdivide the cross-sectional area of the mouth of the shaft into smaller rectangles and prevent ignition of the mixture of air and fuel directly at the mouth of the shaft, notwithstanding the low entrance velocity of the mixture.

As already explained above, the tapering portion 3 of the distributing nozzle and the slits 4 are so arranged and proportioned, that the sum total of the cross-sectional area at any point of tapering part 3 and the cross-sectional area of the slits 4 from their origin down to this point are equal to the cross-sectional area of the supply conduit. In other words, if the cross-sectional area of the supply conduit is $a$, the cross-sectional area of the tapering portion 3 halfway between the two ends of this portion at $b$ will be $\frac{a}{2}$, and the cross-sectional area of all the slits together from the point $c$ to the point $b$ will be $\frac{a}{2}$ also.

The same is true with respect to all other points of the tapering portion 3. I wish it to be understood however that this relation is by no means intended to be kept up strictly, a variation of the proportions within certain limits being possible without departing from the invention.

In the modification illustrated in Figs. 3 and 4, $3^a$ is the tapering portion of a distributing nozzle described with reference to Fig. 1, and 11 is a conduit connecting it with the upper portion $7^a$ of the shaft mounted above the bottom portion $8^a$ which is fixed in place in the furnace cover $9^a$. $5^a$ is a baffle mounted in parallel with the outlet of conduit 11, 12 is a grate or sieve made of perforated sheet metal, wire gauze or the like, and 13 is a secondary air conduit, $6^a$, $6^a$ being partitions subdividing the upper part $7^a$ of the shaft. In this modification the distributing nozzle $3^a$ is supplied with a mixture of primary air and fuel which is blown with high velocity into the slowly descending current of secondary air entering through the conduit 13, the grate or sieve 12, the free cross-sectional area of which corresponds to the cross-sectional area of the conduit 11, serving for securing a uniform distribution of secondary air all over the shaft.

In the boiler furnace illustrated in Figs. 5 and 6, $3^b$ are two distributing nozzles similar to those shown in Figs. 1 and 2, each extending halfway across the width of the combustion chamber 15. The brickwork forming the chamber is water-cooled by means of a system of cooling tubes 16, and 17 is the front wall adjoining the shaft and which is particularly exposed to the heat of the flame. In order to prevent it from being destroyed, I prefer constructing it from perforated bricks such as described in my Patent of the United States No. 1,625,082.

Obviously the mixture of fuel and air escaping from the slits of the distributing nozzle $3^b$ which extend transversely across the furnace will form a thin veil which is easily ignited and easily permeated by the secondary air.

Instead of a single pair of distributing nozzles $3^b$ I may of course employ a greater number thereof and in the case of a smaller furnace a single distributing nozzle will suffice.

I wish it to be understood that I do not desire to be limited to the exact details of construction shown and described for obvious modifications will occur to a person skilled in the art.

I claim:—

1. Pulverulent fuel firing system comprising a tubular air and fuel distributing nozzle extending substantially horizontally, the diameter of which gradually decreases in the direction of flow of the air and fuel in said nozzle, the bottom wall of said nozzle being provided with slots extending in the direction of flow of air and fuel therein and baffles extending underneath and in parallel with said slots.

2. Pulverulent fuel firing system comprising a tubular air and fuel distributing nozzle extending substantially horizontally, the diameter of which gradually decreases in the direction of flow of the air and fuel in said nozzle, the bottom wall of said nozzle being provided with slots extending in the direction of flow of air and fuel therein and guide walls below and extending substantially at right angles to said slots.

3. Pulverulent fuel firing system comprising a tubular air and fuel distributing nozzle extending substantially horizontally, the diameter of which gradually decreases in the direction of flow of the air and fuel in said nozzle, the bottom wall of said nozzle being provided with slots extending in the direction of flow of air and fuel therein and baffles extending underneath and in parallel with said slots, the taper of the nozzle and the total width of said slots being so proportioned that the sum total of the cross-sectional areas of the nozzle at any point of its length and of the slots from their origin down to this point is substantially equal to the largest cross-sectional area of the nozzle.

In testimony whereof I affix my signature.

ALBIN BERTHOLD HELBIG.